United States Patent [19]
Watanabe et al.

[11] Patent Number: 5,396,392
[45] Date of Patent: Mar. 7, 1995

[54] TAPE CASETTE WITH TAPE CLEANERS

[75] Inventors: Masaru Watanabe, Nishinomiya; Tousaku Nishiyama, Katano; Tsumoru Ohata, Kyoto, all of Japan

[73] Assignee: Matsushita Electric Industrial Co., Ltd., Osaka, Japan

[21] Appl. No.: 56,742

[22] Filed: May 4, 1993

[30] Foreign Application Priority Data

Oct. 9, 1992 [JP] Japan .................................. 4-271341

[51] Int. Cl.⁶ .......................... G11B 23/02; G11B 5/41
[52] U.S. Cl. ..................................... 360/132; 360/128; 15/DIG. 13
[58] Field of Search .................... 360/132, 128, 130.21, 360/130.3, 130.31, 130.32, 103.33, 137; 15/DIG. 12, DIG. 13; 242/197, 198, 199

[56] References Cited

U.S. PATENT DOCUMENTS

| | | |
|---|---|---|
| 1,286,790 | 4/1971 | Townsend . |
| 4,345,284 | 8/1982 | Saito ..................... 360/132 |
| 4,984,119 | 1/1991 | Backlund et al. ............... 360/128 |
| 5,081,555 | 1/1992 | Rohloff ..................... 360/132 |

FOREIGN PATENT DOCUMENTS

| | | |
|---|---|---|
| 0096983 | 5/1983 | European Pat. Off. . |
| 0096994 | 5/1983 | European Pat. Off. . |
| 0114115 | 1/1984 | European Pat. Off. . |
| 0302974 | 2/1989 | European Pat. Off. ............ 360/132 |
| 26 34 161 | 2/1977 | Germany . |
| 55-97067 | 7/1980 | Japan ........................... 360/132 |
| 2140388 | 11/1984 | United Kingdom ............. 360/132 |

Primary Examiner—Robert S. Tupper
Assistant Examiner—William J. Klimowicz
Attorney, Agent, or Firm—Wenderoth, Lind & Ponack

[57] ABSTRACT

A tape cassette for accommodating a reeled length of magnetic recording tape comprises a generally rectangular flattened box-like configuration. The cassette has top and bottom panels, front and rear wall and a pair of side walls. The front wall has a head access window and a pair of pinch roller access windows all defined therein. While a portion of the length of magnetic tape extends in the vicinity of and parallel to the front wall, tape cleaners are secured to front wall portions defined between the head access window and the pinch roller access windows so as to slidingly contact that portion of the length of magnetic recording tape as the latter is transported from one reel to the other reel. Each tape cleaner may be a fiber-intertwined cleaning member made of non-woven fabric or a fiber-tufted cleaning member made of crimped or curled fibers closely planted on a backing. With the fiber-intertwined cleaning members, that portion of the length of magnetic recording tape that is held in sliding contact with an intermediate portion of each fiber-intertwined cleaning member is rearwardly biased a predetermined bias distance within the range of 0.5 to 1 mm. With the fiber-tufted cleaning members, that portion of the length of magnetic recording tape that is held in sliding contact with an intermediate portion of each fiber-intertwined cleaning member is rearwardly biased a predetermined bias distance within the range of 0.1 to 1 mm.

18 Claims, 5 Drawing Sheets

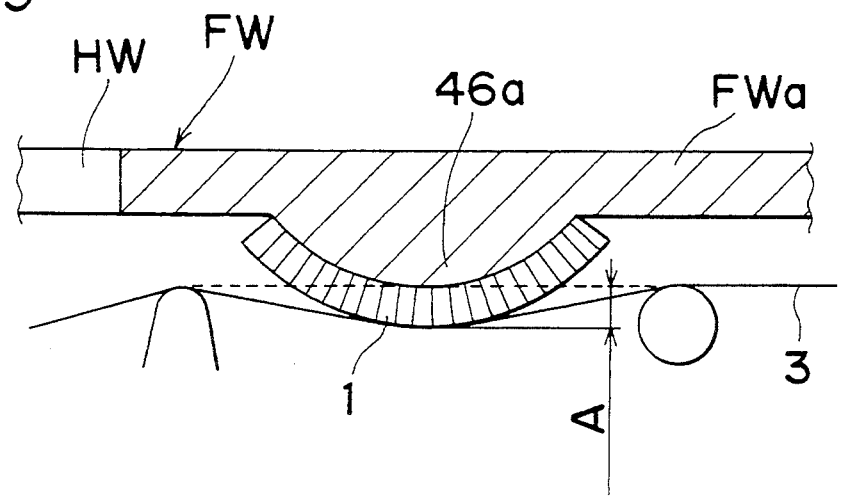
Fig.3
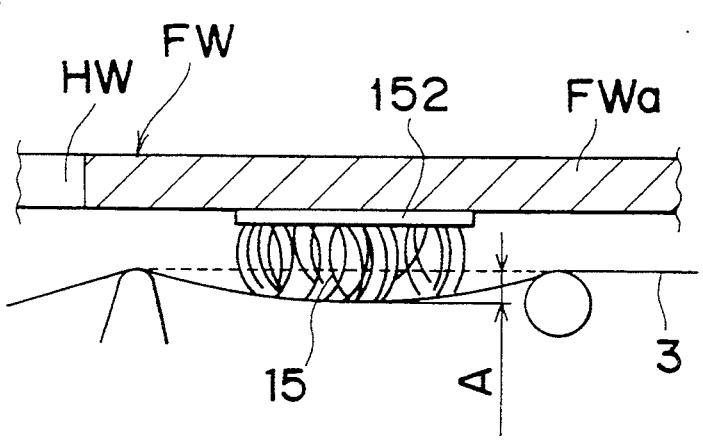
Fig.5
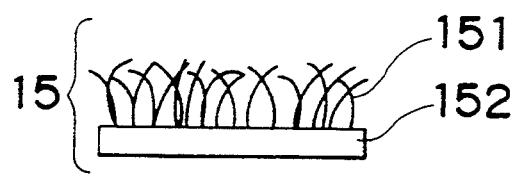
Fig.6
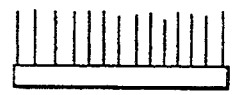
Fig.7 - PRIOR ART

TAPE CASETTE WITH TAPE CLEANERS

CROSS REFERENCE TO THE RELATED APPLICATIONS

U.S. patent application entitled "TAPE CASSETTE" and filed Feb. 4, 1993, U.S. Ser. No. 08/103,378, in the name of M. Watanabe et al.

BACKGROUND OF THE INVENTION

1. Field of the Invention

The present invention generally relates to a tape cassette for accomodating a reeled length of magnetic recording tape utilized for recording or reproducing information such as music, thereon or therefrom, respectively. More particularly, the present invention relates to the tape cassette having tape cleaners for cleaning the reeled length of magnetic recording tape as the latter travels from one reel to the other reel.

2. Description of the Prior Art

As a means for digitally recording or reproducing information such as, for example, music, a digital signal recording or reproduction with the use of a fixed magnetic head is well known. In terms of a high fidelity sound recording or reproduction, it is very important for the digital recording and/or reproducing system to reproduce the information at as small an error rate as possible. The error rate referred to previously and hereinafter is defined as meaning the rate of the number of error signals relative to the number of data read from a length of magnetic recording tape which has been recorded with signals.

The tape cassette generally includes tape guides which are held in sliding contact with the reeled length of magnetic recording tape when the tape cassette is in use with the length of magnetic recording tape travelling from one reel to another. A long term use of the tape cassette often results in an accumulation, inside the tape cassette, of shavings of one or both of the tape guides and the length of magnetic recording tape due to repeated sliding contact therebetween and also of dust having entered the tape cassette. The foreign matter such as the shavings and/or the dust accumulated within the tape cassette are apt to adhere to a recording surface of the magnetic recording tape which is scanned by the magnetic head, and therefore, when the magnetic head scans a recorded track of the magnetic recording tape, the magnetic head gives rise to an increased error rate.

It has been found that, when information was digitally recorded and then reproduced from the length of magnetic tape contained in the prior art tape cassette, the error rate has been found to be high at $5 \times 10^{-3}$ which is detrimental to the quality of products, that is, cassette magnetic tapes, for use in digital information recording or reproduction.

In an effort to substantially eliminate the above discussed problem, the inventors of the present invention have suggested in Japanese Patent Application No. 4-22392, filed Feb. 7, 1992, in Japan (corresponding to U.S. patent application Ser. No. 08/013,378 entitled "TAPE CASSETTE" and filed Feb. 4, 1993, in the name of M. Watanabe et al.), the use of a tape cleaner made of a piece of non-woven fabric within the tape cassette.

According to the above mentioned prior application, the error rate has successfully been reduced to a stable value on the order of $10^{-5}$. In the tape cassette disclosed in the prior application, the tape cassette includes a pair of generally rectangular flat panels, and a peripheral wall disposed between the top and bottom panels to keep them spaced apart a distance sufficient to accommodate a length of magnetic recording tape within the casing and including front and rear wall sections and a pair of side wall sections, all assembled together to cause the tape cassette to represent a generally rectangular, generally flattened box-like configuration. The front wall section of the magnetic tape cassette has at least three access windows defined therein; first and second pinch roller access windows and a head access window positioned midway between the first and second pinch roller access windows.

Within the tape cassette, there is disposed a pair of freely rotatable reels to which opposite ends of the length of magnetic recording tape are anchored, respectively; a pair of guide rollers rotatably disposed at respective corner areas adjacent the front wall section; a generally elongated tape guide rockably disposed generally parallel to the front wall section and extending between the guide rollers; a magnetic shield piece fixedly carried by the tape guide so as to confront the head access window; a perforated guide unit carried by the tape guide so as to confront the head access window; and a pressure pad carried by the tape guide via a leaf spring resiliently urging the presser pad to protrude through the perforation in the guide unit towards the head access window to thereby ensure a positive contact between the magnetic head and a portion of the length of magnetic recording tape traversing the presser pad. All these elements are accommodated and disposed therein in a manner well known to those skilled in the art.

The tape cleaner disclosed in the above mentioned prior application comprises a generally rectangular plastics backing or film and a piece of non-woven fabric rigidly mounted on the plastic backing. This tape cleaner is disposed at the corner regions adjacent the front wall section and in close proximity to the guide rollers. The piece of non-woven fabric is normally urged towards the respective guide roller against the resiliency of the corresponding plastic backing so that, during travel of the length of magnetic recording tape from one reel to the other reel, the recording surface of the magnetic recording tape can be cleaned in sliding contact with the associated piece of non-woven fabric as it passes around the respective guide roller.

In another embodiment disclosed in the prior application, a pair of tension pins are employed within the tape cassette and the pieces of non-woven fabric are utilized to cooperate with the respective tension pins in place of the guide rollers.

Subsequent studies have revealed that the tape cassette disclosed in the prior application has some problems associated with tension present in the length of magnetic recording tape accommodated therein. Specifically, since the tape cleaners are resiliently urged towards the associated guide rollers or tension pins with portions of the length of magnetic recording tape slidably sandwiched between the pieces of non-woven fabric and the guide rollers or the tension pins, not only does a smooth rotation of one or both of the guide rollers tend to be hampered, but a relatively high frictional resistance is developed between each of the pieces of non-woven fabric and the relevant portion of the length of the magnetic recording tape. A measurement of the tension under which the length of magnetic recording tape is held during the travel thereof from one reel to the other reel (hereinafter referred to as tape tension) has been shown to be very high at 40 grams.

If the tape tension is too high, a drive mechanism used in a cassette tape deck or a cassette tape player to drive a capstan must be of a type capable of providing a high driving force to be transmitted to the length of magnetic recording tape as the latter is driven while sandwiched between the capstan and the associated pinch roller. This means that the drive mechanism must have a high load capacity and will thus consume a relatively large amount of electric power, and the increased power consumption is indeed detrimental particularly to a battery-operated compact and/or portable cassette tape player since the length of running time during which the cassette tape player is available for actual information recording and reproduction is shortened.

SUMMARY OF THE INVENTION

The present invention is therefore intended to provide an improved tape cassette employing a tape cleaner, which is effective to keep the length of magnetic recording tape under a minimized tape tension and also to minimize the error rate.

To this end, in accordance with the present invention, the tape cassette employs at least two tape cleaners each in the form of either a generally rectangular fiber-intertwined cleaning member or a generally rectangular fiber-tufted cleaning member having a length and also having a width so chosen as to encompass the width of the length of magnetic recording tape. The tape cleaners are supported by the front wall section and are positioned on respective sides of the head access window and, specifically, between the head access window and one of the pinch roller access windows and between the head access window and the other of the pinch roller access windows.

In one preferred embodiment of the present invention, each tape cleaner is in the form of the rectangular fiber-intertwined cleaning member. The rectangular fiber-intertwined cleaning member is a generally rectangular piece of non-woven fabric which is a cluster of fibers of rayon, nylon, polyester, polypropylene or acryl or a mixture thereof that have been randomly intertwined by a physical means and then appropriately bonded together by the use of a fusion-bonding method to avoid any possible loosening thereof. The rectangular fiber-intertwined cleaning member of the kind referred to above is effective not only to remove unwanted foreign particles from the magnetic recording surface of the magnetic recording tape, but also to trap the unwanted foreign particles, so removed from the magnetic recording tape, within minute interstices formed in the intertwined cluster of the fibers, thereby giving rise to an enhanced cleaning effect while suppressing any possible increase of the error rate.

Each of the rectangular fiber-intertwined cleaning members forming the respective tape cleaners has a coefficient of dynamic friction of 0.3 to 0.35 and, therefore, the use thereof does not substantially hamper a smooth and continuous travel of the length of magnetic recording tape from one reel to the other reel, although the length of magnetic recording tape when contacting the fiber-intertwined cleaning members is held under a tape tension substantially equal to or slightly higher than that exhibited in the tape cassette with no tape cleaner employed.

Where the tape cleaners are employed in the form of the rectangular fiber-intertwined cleaning members, each of the tape cleaners is preferably so supported and so positioned that that portion of the length of magnetic recording tape which is held in contact with the respective tape cleaner is biased rearwardly a distance of 0.05 to 1 mm from the position occupied by that portion of the length of magnetic tape when no tape cleaner is employed. By so doing, the force with which the respective portions of the length of magnetic tape are biased by the associated tape cleaners can be advantageously minimized to a value sufficient to minimize the sliding resistance which would be developed between the length of magnetic recording tape and the tape cleaners, thereby minimizing the tape tension under which the length of magnetic recording tape travels from one reel to the other reel.

According to another preferred embodiment of the present invention, each of the tape cleaners is in the form of the generally rectangular fiber-tufted cleaning member. The rectangular fiber-tufted cleaning member comprises a generally rectangular backing and a tuft 0f synthetic fibers firmly and closely planted on the backing and then curved by the use of any one of curling and crimping techniques. The fiber-tufted cleaning member has a width so chosen as to encompass the width of the length of magnetic recording tape and a length so chosen as to contact the magnetic recording surface over a distance of 1 to 6 mm longitudinally of the length of magnetic recording tape.

The fibers on the backing may be either curled or crimped as indicated above. The curled fibers can be formed by the use of the curling technique wherein the fibers on the backing are pulled lengthwise by the application of a pulling force of a magnitude greater than the limit of elasticity of the fibers to permit the fibers to retain a substantially permanently curled shape. On the other hand, the crimped fibers can be formed by the use of the crimping technique wherein the fibers on the backing are fed through a gap defined between toothed wheels or rolls to permit the fibers to retain a substantially permanently crimped or wavy shape.

The use of the fiber-tufted cleaning members is also effective not only to remove unwanted foreign particles from the magnetic recording surface of the magnetic recording tape, but also to trap the unwanted foreign particles, so removed from the magnetic recording tape, within minute interstices formed among the tufted fibers, thereby giving rise to an enhanced cleaning effect while suppressing any possible increase of the error rate. Specifically, where the fiber-tufted cleaning members are employed, some or all of the individual synthetic fibers forming each of the fiber-tufted cleaning members are, during the use thereof while the length of magnetic recording tape is transported, in sliding contact with the magnetic recording surface of the magnetic recording tape in a line-contact fashion in a direction lengthwise of the fibers. As compared with the face-to-face contact exhibited by each tape cleaner employed in the prior tape cassette, the line-contact of the fibers of each fiber-tufted cleaning member results in a minimized sliding resistance, which would be developed between the length of magnetic recording tape and the respective fiber-tufted cleaning member, and hence, the tape tension can further be reduced.

The capability of the tape cassette permitting the length of magnetic recording tape to run smoothly from one reel to the other reel in the presence of the tape cleaners is particularly important in preventing the drive mechanism from being heavily loaded and, hence, in minimizing the electric power consumption by the drive mechanism. Where the tape cassette employing the tape cleaners in accordance with the present invention is used on a battery-operated portable cassette deck or player, an advantage will be appreciated in that the deck or player can be operated for a prolonged period of time.

A particular disposition of the tape cleaners according to the present invention is important to achieve a reduction in error rate and also to achieve an effective and efficient cleaning of the length of magnetic recording tape. Hence, the tape cleaners according to the present invention are so supported by the front wall section and so positioned on respective sides of the head access window and, specifically, between the head access window and one of the pinch roller access windows and between the head access window and the other of the pinch roller access windows, that shortly before the length of magnetic recording tape is consecutively brought to a recording or reproducing station at which the magnetic head scans the length of magnetic recording tape while the latter is moved relative to the magnetic head, the length of magnetic recording tape is cleaned. In other words, with this particular disposition of the tape cleaners within the tape cassette, no sooner is the length of magnetic recording tape brought into contact with the magnetic head than the length of magnetic head is cleaned.

As discussed hereinabove, the present invention is effective to wipe unwanted foreign particles sticking to the recording surface of the length of magnetic recording tape as the latter runs from one reel to the other without substantially imparting an unreasonable tension to the length of magnetic recording tape. Therefore, the tape cassette according to the present invention can ultimately contribute to a high fidelity sound recording or reproduction on or from a length of magnetic recording tape contained therein.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 3 is a schematic fragmentary sectional view, on a further enlarged scale, of a portion of a front wall of the tape cassette, showing the manner in which a fiber-intertwined cleaning members is supported in relation to a length of magnetic recording tape;

FIG. 4 is a view similar to FIG. 2, but showing a second preferred embodiment of the present invention;

FIG. 5 is a view similar to FIG. 3, but showing the manner in which a fiber-tufted cleaning members is supported in relation to a length of magnetic recording tape according to the second embodiment of the present invention;

FIG. 6 is a schematic side view of the fiber-tufted cleaning member used in the tape cassette according to the second embodiment of the present invention;

FIG. 7 is a view similar to FIG. 6, but showing the prior art cleaning member;

DETAILED DESCRIPTION OF THE EMBODIMENTS

A tape cassette that can be employed in the practice of the present invention is generally standardized in size and configuration so that it can be used with a commercially available cassette tape deck or player. This tape cassette comprises a pair of rectangular panels, and a peripheral wall disposed between the top and bottom panels to keep them spaced apart a distance sufficient to accommodate a length of magnetic recording tape within the casing and including front and rear wall sections and a pair of side wall sections, all assembled together to cause the tape cassette to represent a generally rectangular, generally flattened box-like configuration. The front wall section of the magnetic tape cassette has at least three access windows defined therein; first and second pinch roller access windows and a head access window positioned midway between the first and second pinch roller access windows.

In practice, the tape cassette is divided into two casing halves along a plane at a generally intermediate position of the thickness of the peripheral wall as will now be described with reference to FIG. 1.

Figure 1:
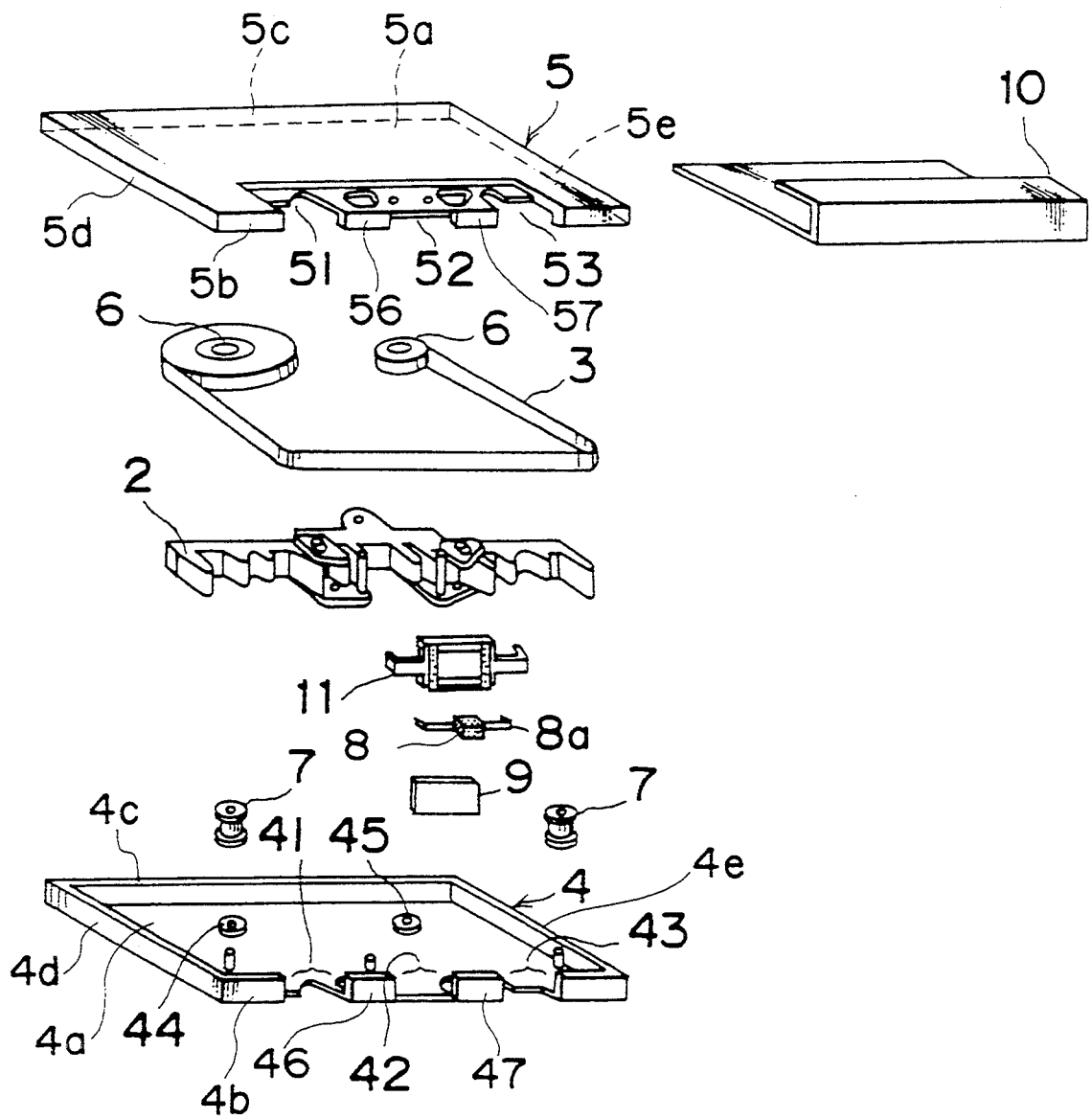
FIG. 1 is an exploded view of a tape cassette usable in the practice of the present invention.

Referring now to FIG. 1, the tape cassette shown therein comprises rectangular bottom and top casing halves 4 and 5 each having top or bottom panel segment 4a or 5a, front and rear wall segments 4b and 4c or 5b and 5c and a pair of side wall segments 4d and 4e or 5d and 5e, all assembled together by means of a plastic molding technique so that the complete tape cassette including the top and bottom panels, the front and rear wall sections and a pair of the side wall segments can be formed having a tape chamber defined therein when the top and bottom casing halves 5 and 4 are mounted one above the other and fastened together by the use of either set screws or a fusion bonding technique with the top panel segment 5a, the front and rear wall segments 5b and 5c and the side wall segments 5d and 5e of the top casing half 5 aligned respectively with the bottom panel segment 4a, the front and rear wall segments 4b and 4c and the side wall segments 4d and 4e of the bottom casing half 4.

While the tape cassette is generally made of two casing halves of generally identical construction, and since the details of each of the casing halves do not constitute subject matter of the present invention, reference is made to the tape casing as having the top and bottom panels, the front and rear wall sections and the pair of side wall sections for the sake of brevity. Specifically, the front wall section constituted by the front wall segments 4b and 5b is generally shown by FW in FIGS. 2 to 5 and 9; the rear wall section constituted by the rear wall segments 4c and 5c is generally identified by RW in FIGS. 2 and 9; and the pair of side wall sections constituted by the pair of the side wall segments 4d and 5d, 4e and 5e are generally identified by SW in FIGS. 2, 4 and 9.

Referring still to FIG. 1, the tape cassette has a pair of guide rollers 7 rotatably disposed at respective corner areas adjacent the front wall section FW; a pair of freely rotatable reels 6; a length of magnetic tape 3 having its opposite ends anchored to the respective reels 6; a generally elongated tape guide 2 rockably (or pivotably) disposed generally parallel to the front wall section FW and extending between the guide rollers 7; a magnetic shield piece 9 fixed on an intermediate portion of the tape guide 2; and a presser pad 8 carried by the tape guide 2 through a leaf spring 8a resiliently urging the presser pad 8 to protrude through a perforation in a guide unit 11 towards the front wall section FW to thereby ensure a positive contact between the magnetic head and a portion of the length of magnetic recording tape 3 then traversing the presser pad 8, all accommodated and disposed therein in a manner well known to those skilled in the art.

Reference numerals 41, 42 and 43 represent respective cutouts formed in the front wall segment 4b and a front edge portion of the bottom panel segment 4a of the bottom casing half 4, while leaving discrete wall pieces 46 and 47 in the front wall segment 4b. Reference numerals 51, 52 and 53 represent respective similar cutouts formed in the front wall segment 5b and a front edge portion of the top panel segment 5a of the top casing half 5, while leaving discrete wall piece 56 and 57 in the front wall segment 5b. When the bottom and top casing halves 4 and 5 are mated together to complete the tape cassette, the cutouts 41, 42 and 42 in the bottom casing half 4 align with the cutouts 51, 52 and 53 in the top casing half 5 to define a first pinch roller access window, a head access window and a second pinch roller access window, respectively. The first and second pinch roller access windows and the head access window are identified by W1 and W2 and HW, respectively, in FIGS. 2, 4 and 9. At the same time, the discrete wall pieces 46 and 47 in the bottom casing half 4 cooperate respectively with the discrete wall piece 56 and 57 in the top casing half 5 to define front wall portions FWa and FWb shown in FIGS. 2, 4 and 9.

To avoid any possible entry of foreign matter into the tape chamber through the access windows W1, W2 and HW in the tape cassette, the magnetic tape cassette includes a shutter plate 10 mounted thereon for sliding movement between open and closed positions in a direction parallel to the lengthwise direction of the tape cassette. In practice, when and so long as the tape cassette is loaded into the cassette tape player or deck, the shutter 10 is automatically moved to the open position to expose the access windows W1, W2 and HW. When the tape cassette is removed and stored out of the cassette tape player or deck, the shutter 10 is biased to the closed position to conceal the access windows W1, W2 and HW.

While the tape cassette of the above described structure may be well known to those skilled in the art, the elongated tape guide 2 is preferably made of polyacetal resin mixed with carbon powder to cause the tape guide 2 to exhibit a minimized friction relative to the length of magnetic recording tape 3 during the travel of the latter from one reel 6 to the other reel 6 in contact therewith.

Figure 2:
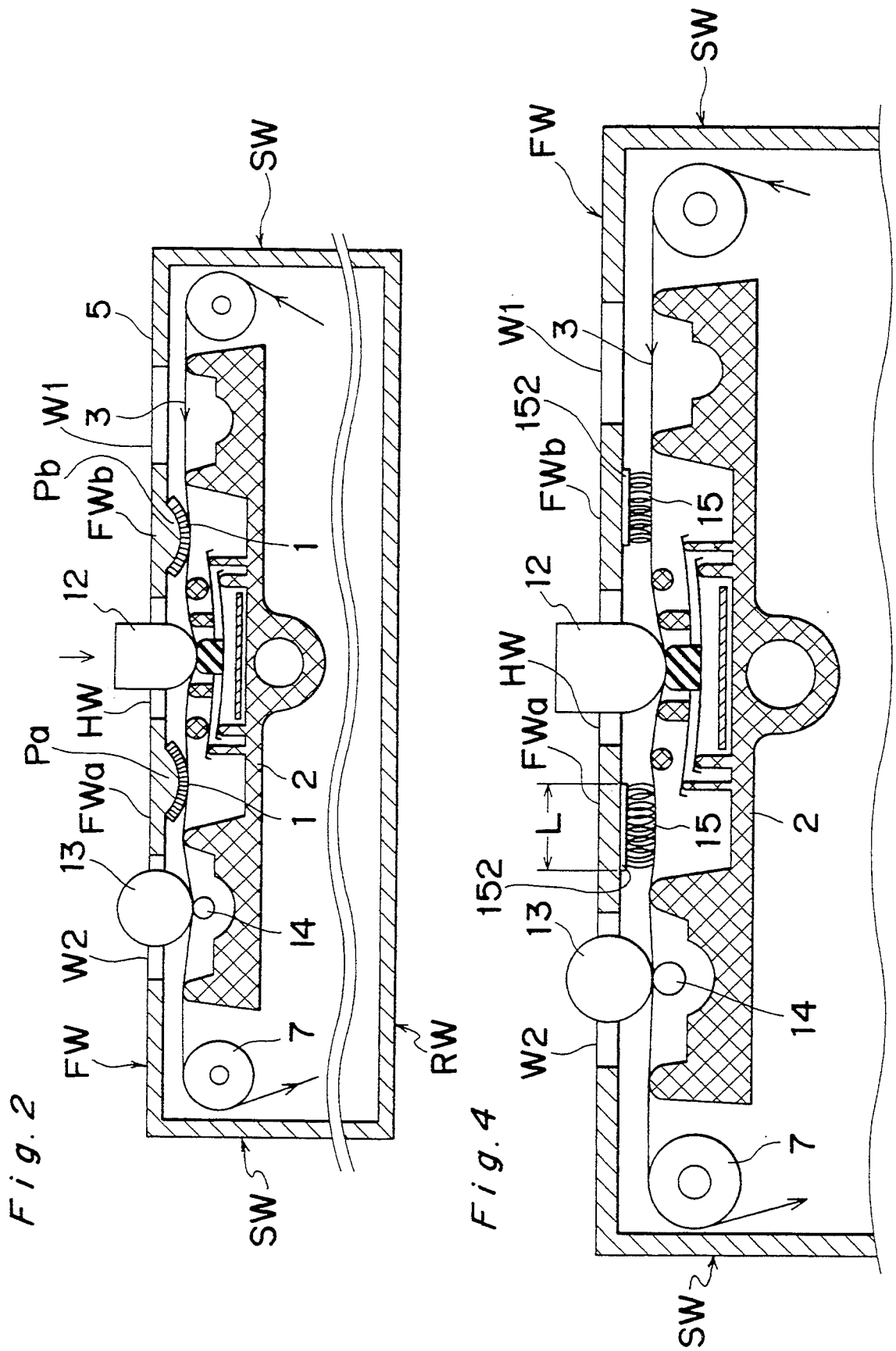
FIG. 2 is a longitudinal sectional view, on an enlarged scale, showing component parts within the tape cassette according to a first preferred embodiment of the present invention.

Referring to FIGS. 2 and 3 showing a first preferred embodiment of the present invention, the tape cassette includes a pair of tape cleaners of identical structure each in the form of a fiber-intertwined cleaning member 1. FIG. 2 illustrates a condition in which the tape cassette embodying the present invention is inserted into the cassette tape player and, hence, in which a magnetic recording and/or reproducing head 12 is held at an operative position having protruded a distance into the tape cassette through the head access window HW and, at the same time, a pinch roller 13 and a motor-coupled capstan 14 are similarly protruding a distance into the tape cassette through the second pinch roller access window W2 to drivingly sandwich the length of magnetic recording tape 3.

As best shown in FIG. 2, the rectangular fiber-intertwined cleaning members 1 are secured to an interior of the front wall portions FWa and FWb left in the front wall section FW when the cutouts 41 to 43 and 51 to 53 were, as shown in FIG. 1, formed in the front wall segment 4b of the bottom casing half 4 and in the front wall segment 5b of the top casing half 5, respectively. Hence, the cleaning member 1 are disposed between the second pinch roller access window W2 and the head access window HW and between the first pinch roller access window W1 and the head access window HW, respectively. Each of the fiber-intertwined cleaning members 1 has a width slightly greater than the width of the length of magnetic recording tape 3 and a length lying parallel to the length of magnetic recording tape 3.

Each of the front wall portions FWa and FWb has a generally semi-cylindrical protuberance Pa and Pb formed integrally therewith. The longitudinal axis of each of the protuberances lies transverse to the length of magnetic recording tape 3, and each of the protuberances protrudes towards the path of travel of the length of magnetic recording tape 3. The cleaning members 1 are so secured to the semi-cylindrical protuberances Pa and Pa integral with the front wall portions FWa and FWb, respectively, so that only generally intermediate portions of the cleaning members 1 can be brought into sliding contact with the length of magnetic recording tape 3.

Causing only the intermediate portions of the cleaning members 1 slidingly contact the length of magnetic recording tape 3 is effective to permit the cleaning members 1 to slidingly contact the length of magnetic recording tape 3 uniformly over the width of the length of magnetic recording tape 3 as compared with the face-to-face contact exhibited by each tape cleaner employed in the prior tape cassette. Accordingly, not only is an efficient and effective cleaning of the length of magnetic recording tape 3 possible during the travel thereof, but the tape tension under which the length of magnetic recording tape 3 travels is also advantageously reduced, even though the surface area of contact of each cleaning member 1 with the length of magnetic recording tape 3 is small as compared with that afforded by the face-to-face contact.

More specifically, if each cleaning member 1 were allowed to contact the length of magnetic recording tape 3 in face-to-face fashion, the surface area of contact of such cleaning member with the length of magnetic recording tape 3 would relatively large so as to impart a relatively large sliding resistance to the movement of the length of magnetic recording tape and, hence, to place the length of magnetic recording tape under an increased tape tension. Again, the face-to-face contact between the respective cleaning member and the length of magnetic recording tape may result in an increased frictional resistance which in turn imposes a shearing force on the cleaning member. Once this occurs, a trailing edge of the cleaning member with respect to the direction of travel of the length of magnetic recording tape may be torn during sliding contact with the moving length of magnetic recording tape and, in a worst case scenario, the cleaning member may be peeled off from the support.

However, according to the present invention, the cleaning members 1 have no edges thereof held in contact with the length of magnetic recording tape 3 and, therefore, the above discussed problems do not occur in the practice of the present invention. Also, as hereinbefore discussed, the disposition of the cleaning members 1 on respective sides of the head access window HW and, specifically, between the head access window HW and the pinch roller access window W1 and between the head access window HW and the pinch roller access window W2, is advantageous in that, shortly before the length of magnetic recording tape is consecutively brought to a recording or reproducing station at which the magnetic head scans the length of magnetic recording tape while the latter is moved relative to the magnetic head, the cleaning members contact the length of magnetic recording tape. This makes possible a maximized utilization of the cleaning effect by the cleaning members 1.

Also as hereinbefore discussed, each of the fiber-intertwined cleaning members 1 is made of a piece of non-woven fabric which is a cluster of fibers of rayon, nylon, polyester, polypropylene or acryl or a mixture thereof that have been randomly intertwined by a physical means and then appropriately bonded together by the use of a fusion-bonding method to avoid any possible loosening thereof. The commercially available non-woven fabric manufactured by Veratec and identified by a product number, 149-303, 149-246, 149-188 or 149-007 or that manufactured by Mitsubishi Rayon Kabushiki Kaisha of Japan and identified by VA-250 can be utilized as a material for each fiber-intertwined cleaning member 1. Each fiber-intertwined cleaning member 1 prepared from this commercially available non-woven fabric has shown a coefficient of dynamic friction of 0.3 to 0.35 relative to the length of magnetic recording tape 3. Since a difference in brand and make of the commercially available non-woven fabric does not cause an adverse effect on the tape tension, any of these commercially available non-woven fabrics may be effectively and advantageously employed in the practice of the present invention.

As indicated above, with the cleaning members 1 secured to the respective front wall portions FWa and FWb, only the intermediate portion of each cleaning member 1 protrudes a distance relative to the opposite end portions thereof, so as to permit only the intermediate portion of the respective cleaning member 1 to be held in sliding contact with the length of magnetic recording tape while that portion of the length of magnetic recording tape 3 that is held in contact with the intermediate portion of the respective cleaning member 1 is biased a predetermined bias distance rearwardly. This bias distance over which that portion of the length of magnetic recording tape 3 is rearwardly biased in contact with the intermediate portion of the respective cleaning member 1 will now be discussed with particular reference to FIG. 3.

In the practice of the present invention, the bias distance, indicated by A in FIG. 3, for each cleaning member 1 is chosen to be within the range of 0.05 to 1 mm. If this bias distance A is smaller than 0.05 mm, the cleaning effect will be adversely affected, but if it is greater than 1 mm, the sliding resistance developed between the respective cleaning member 1 and the length of magnetic recording tape will increase to such an extent as to result in an increased tension of the length of magnetic recording tape 3. The bias distance A referred to above is defined as measured from the position which the respective portion of the length of magnetic recording tape 3 aligned with the front wall portion FWa or FWb would occupy while held straight in the event that no cleaning member is employed, as shown by the phantom line in FIG. 3, to a position to which that portion of the length of magnetic recording tape 3 has been biased in contact with the associated cleaning member 1 as shown by the solid line in FIG. 3.

The bias distance A of those portions of the length of magnetic recording tape 3 within the required range can be attained by the use of any suitable method or means. In the illustrated embodiment, however, the use is made of the generally semi-cylindrical protrusions Pa and Pb that protrude from the associated front wall portions FWa and FWb a distance necessary to allow those portions of the length of magnetic tape 3 to full within the required range of the bias distance A.

Figure 10:
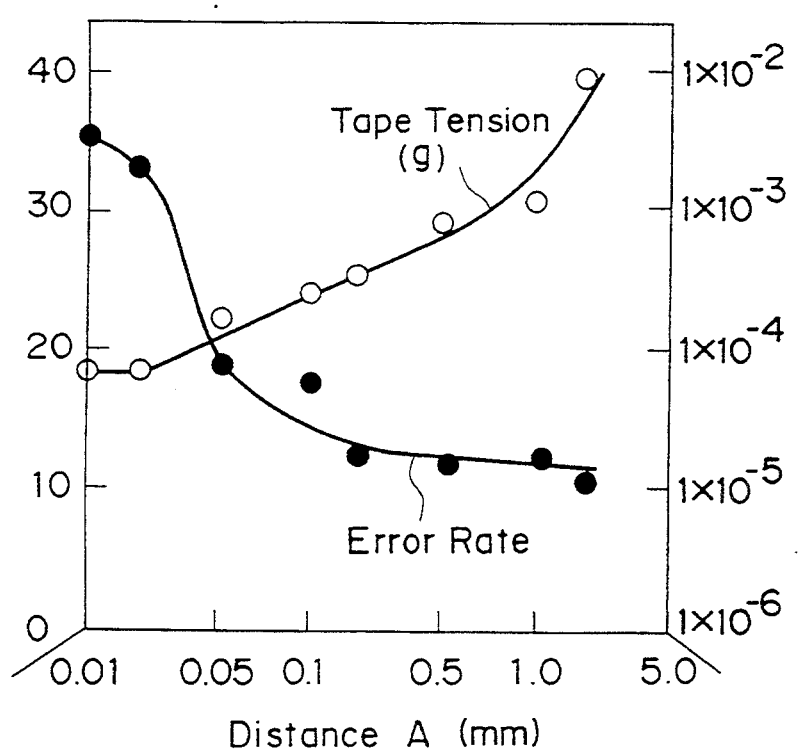
FIG. 10 is a graph showing a relationship between the bias distance, over which a portion of the length of magnetic recording tape is biased in contact with the respective tape cleaner, and the error rate.

A series of experiments conducted have produced the results shown in the graph of FIG. 10. That is, if the bias distance A is smaller than 0.05 mm, the error rate increases although the tape tension of the length of magnetic tape is low, posing a problem associated with the quality of the tape cassette. This is because the bias distance A is too small to accomplish an effective cleaning of the length of magnetic recording tape. On the other hand, if the bias distance A is greater than 1 mm, the tape tension approaches 40 grams which is an undesirable value.

Using the tape cassette of the above described construction in which the fiber-intertwined cleaning members 1 have been fitted in the manner shown in and described with reference to FIG. 2, tests have been conducted to measure the tape tension and the error rate. A tension meter for this purpose was inserted between the capstan pin and the magnetic head while the length of magnetic recording tape was driven in one direction within the tape cassette while the tape cassette was loaded in a cassette tape player set to operate in a play mode. The measurement indicated a tape tension of 25 grams which is considerably smaller than the 40 grams of tension exhibited in the prior tape cassette disclosed in the previously discussed prior application.

In determining the error rate, a signal was recorded at a signal frequency of 48 KHz on the length of magnetic recording tape contained in the tape cassette of the above described construction, and the error rate was measured by reproducing the recorded signal from the length of magnetic tape. The measurement indicated a low error rate of $2 \times 10^{-5}$.

From the foregoing, it has now become clear that the tape cassette provided with the fiber-intertwined cleaning members 1 is effective to reduce the tape tension and also to suppress the error rate.

In the foregoing embodiment, each of the tape cleaners has been shown and described as employed in the form of the fiber-intertwined cleaning member 1. However, each tape cleaner may be a fiber-tufted cleaning member which will now be described with reference to FIGS. 4 to 6 which show a second preferred embodiment of the present invention.

As best shown in FIG. 4, the fiber-tufted cleaning members, generally identified by 15, are secured to an interior of the front wall portions FWa and FWb of the front wall section FW, that is, between the second pinch roller access window W2 and the head access window HW and between the first pinch roller access window W1 and the head access window HW, respectively. The fiber-tufted cleaning members 1 have a width slightly greater than the width of the length of magnetic recording tape 3 and a length so chosen as to permit each fiber-tufted cleaning member 15 to contact the length of magnetic recording tape 3 over a distance L within the range of 1 to 6 mm. If this distance L is smaller than 1 mm, the cleaning effect will be adversely affected, but if it is greater than 6 mm, the sliding resistance developed between the respective cleaning member 15 and the length of magnetic recording tape will increase to such an extent as to result in an increased tension of the length of magnetic recording tape 3.

Each of the fiber-tufted cleaning members 15 is so positioned and so secured to the respective front wall portion FWa or FWb that that portion of the length of magnetic recording tape 3 that is held in contact with the respective cleaning member 15 is biased a predetermined bias distance rearwardly. This bias distance, shown by A in FIG. 5, over which that portion of the length of magnetic recording tape 3 is rearwardly biased in contact with the respective cleaning member 15 is, in the embodiment of FIGS. 4 to 6, chosen to be within the range of 0.05 to 1 mm. If this bias distance A is smaller than 0.01 mm, the cleaning effect will be adversely affected, but if it is greater than 1 mm, the sliding resistance developed between the respective cleaning member 15 and the length of magnetic recording tape will increase to such an extent as to result in an increased tension of the length of magnetic recording tape 3. The bias distance A referred to above in connection with the embodiment of FIGS. 4 to 6 is defined from the position which the respective portion of the length of magnetic recording tape 3 aligned with the front wall portion FWa or FWb would occupy while held straight in the event that no cleaning member is employed, as shown by the phantom line in FIG. 5, to a position to which that portion of the length of magnetic recording tape 3 has been biased in contact with the associated cleaning member 15 as shown by the solid line in FIG. 5.

As best shown in FIG. 6, each fiber-tufted cleaning member 15 comprises a generally rectangular backing 152 and a tuft of synthetic fibers 151 firmly and closely planted on the backing 152 and then curved by the use of any curling or crimping technique. If the synthetic fibers planted on the backing are not subjected to neither curling nor crimping and are allowed to extend straight such as shown in FIG. 7, the resultant cleaning member will fail to trap unwanted particulates, so removed from the length of magnetic recording tape, within minute interstices formed among the fibers. In other words, with the fiber-tufted cleaning member wherein the fibers 151 are curled or crimped, the expected cleaning effect can be greatly enhanced.

Also, since the second embodiment of the present invention requires the bias distance A to be very small at 0.05 to 1 mm, only tips of the fibers would slidingly contact the length of magnetic recording tape if the cleaning member having the structure shown in FIG. 7 were employed. In such case the non-tufted fibers would contact the length of magnetic recording tape in a point-contact fashion, resulting in a failure to clean the length of magnetic recording tape satisfactorily such that longitudinally extending markings are left uncleaned, and also a failure to trap the unwanted foreign particles.

However, each fiber-tufted cleaning member 15, wherein the fibers 151 have been curled or crimped in accordance with the present invention, slidingly contacts the length of magnetic recording tape in a line-contact fashion and, therefore, a satisfactory cleaning effect can be achieved in that not only can the unwanted foreign particles be trapped among the interstices formed in the tuft of the fibers 151, but any possible increase of the error rate can also be suppressed.

The fibers 151 forming each fiber-tufted cleaning member 15 are preferably made of nylon or polyester or a mixture thereof and have a fiber diameter within the range of 1 to 40 $\mu$m and a length of 0.2 to 2 mm. Those fibers 151 are preferably planted on the backing 152 at a density of 300 to 1,000 fibers per square millimeter. If they depart from the above described ranges, the resultant fiber-tufted cleaning members will fail to trap the unwanted foreign particles, and the error rate suppressing effect will be reduced.

It is to be noted that the backing 152 for each fiber-tufted cleaning member 15 may be of any suitable material, provided that the tuft of the fibers 151 can be planted thereon.

Using the tape cassette of the above described construction in which the fiber-tufted cleaning members 15 have been fitted in the manner shown in and described with reference to FIG. 4, tests have been conducted to measure the tape tension and the error rate. A tension meter for this purpose was inserted between the capstan pin and the magnetic head while the length of magnetic recording tape was driven in one direction within the tape cassette while the tape cassette was loaded in a cassette tape player set to operate in a play mode. The measurement indicated a tape tension of 15 grams which is smaller than that exhibited during use of the fiber-intertwined cleaning members 1 and which is also considerably smaller than the 40 grams exhibited in the prior tape cassette disclosed in the previously discussed prior application.

Also, in determining the error rate, a signal was recorded at a signal frequency of 48 KHz on the length of magnetic recording tape contained in the tape cassette of the above described construction, and the error rate was measured by reproducing the recorded signal from the length of magnetic tape. The measurement indicated a low error rate of $3 \times 10^{-5}$. Thus, it has now become clear that the tape cassette provided with the fiber-tufted cleaning members 15 is effective to reduce the tape tension and also to suppress the error rate.

In describing the second preferred embodiment of the present invention, each fiber-tufted cleaning member 15 has been described as being secured to the respective front wall portion FWa or FWb. This can be accomplished by the use of any suitable bonding method, for example, by the use of a double-sided adhesive tape, a bonding agent or a fusion bonding. In order to ensure that the respective fiber-tufted cleaning member 15 does not separate from the associated front wall portion FWa or FWb even if a shearing force acts thereon as a result of the sliding resistance developed between the length of magnetic tape and the respective fiber-tufted cleaning member 15, the respective fiber-tufted cleaning member 15 may be seated within corresponding recesses 16 defined in the respective front wall portions FWa and FWb substantially as shown in FIG. 8.

Figure 8:
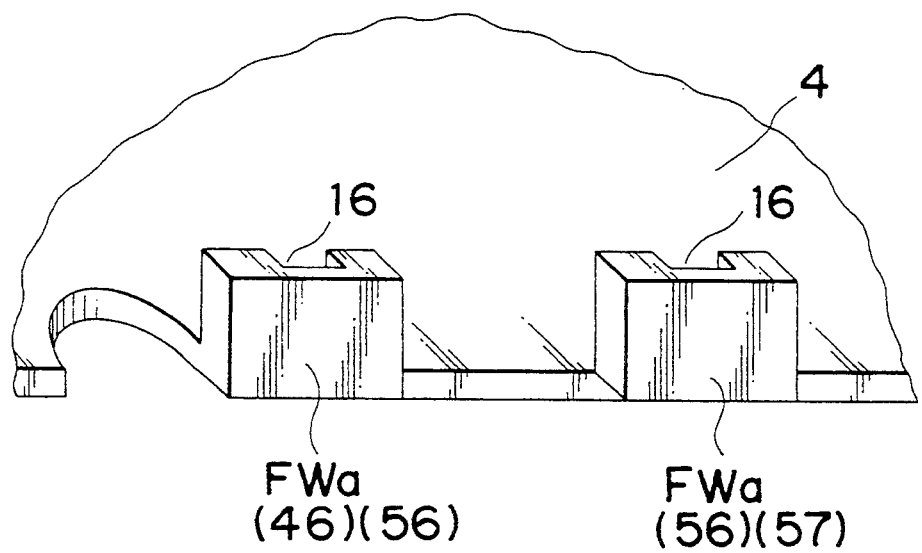
FIG. 8 is a schematic fragmentary perspective view of a portion of a front wall, showing fitting grooves for support of a respective tape cleaner.

Each of the recesses 16 shown in FIG. 8 is in practice composed of a pair of recess segments defined in the discrete wall pieces 46 and 56 (FIG. 1) and the discrete wall piece 47 and 57 (FIG. 1) so that, when the top and bottom casing halves 5 and 4 are mated together, the recess segments form the respective recesses 16 in the respective front wall portions FWa and FWb referred to above.

Figure 9:
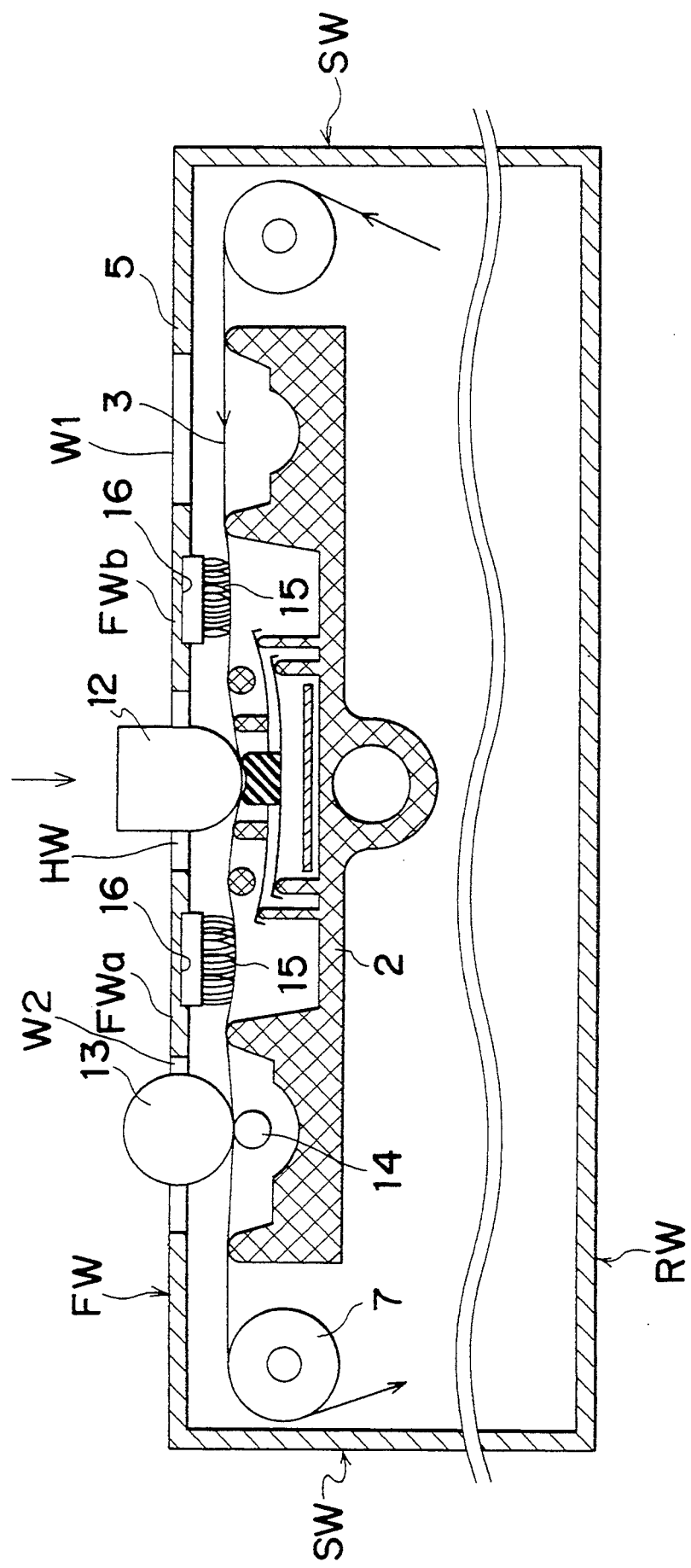
FIG. 9 is a view similar to FIG. 2, but showing the manner in which the tape cleaners are fitted to the front wall of the tape cassette.

The condition in which the fiber-tufted cleaning members 15 are seated within and then bonded to the bottoms of the recesses 16 is shown in FIG. 9.

To demonstrate the superiority of the present invention, 100 tape cassettes having the construction shown in FIG. 9 were prepared and tests were conducted to determine whether one or both of the fiber-tufted cleaning members 15 had separated from the recesses 16. At this time, with the individual tape cassettes individually loaded into the cassette tape player, the length of magnetic recording tape in each tape cassette was transported in a reciprocating manner in a play mode between the reels in 200 cycles. The test result was that no separation of any of the fiber-tufted cleaning members 15 occurred in any of the 100 tape cassettes.

For comparison purpose, similar tests were conducted under the same conditions using 100 tape cassettes wherein the fiber-tufted cleaning members 15 were secured to the respective front wall portions FWa and FWb as shown in FIG. 4 and, hence, wherein no recess such as shown by 16 in FIGS. 8 and 9 was employed. The test result was that a separation of the fiber-tufted cleaning members 15 was found in 10 of 100 tape cassettes tested. This indicates that the use of the recesses 16 for accommodating the fiber-tufted cleaning members 15 is effective to avoid possible separation of the cleaning members during the use of the tape cassette according to the present invention.

Although the present invention has been described in connection with the preferred embodiments thereof with reference to the accompanying drawings, it is to be noted that various changes and modifications are apparent to those skilled in the art. For example, although in the foregoing description of the various embodiments of the present invention the tape cassette has been described and shown as composed of the top and bottom casing halves, the cassette casing may comprise a generally rectangular top panel and a generally rectangular cup-like tape container or a generally rectangular bottom panel and a generally rectangular cap-like casing. Such changes and modifications are to be understood as included within the scope of the present invention as defined by the appended claims, unless they depart therefrom.

What is claimed is:

1. A tape cassette which comprises:
   a casing including top and bottom rectangular flat panels and a peripheral wall disposed between said top and bottom panels to keep them spaced apart a distance to define a tape chamber, said peripheral wall including front and rear wall sections and a pair of side wall sections, said top and bottom panels being assembled together with said peripheral wall to form a generally rectangular, generally flat box-like configuration;
   said front wall section having first, second and third access windows defined therein and spaced apart from one another so as to leave first and second front wall portions between said first and second access windows and between said second and third access windows, respectively, said second access window being adapted to receive therein a magnetic recording and/or reproducing head, and said first and third access windows being adapted to receive therein a pinch roller and a motor-coupled capstan;
   a pair of freely rotatable reels accommodated within said tape chamber;
   a pair of spaced apart guide rollers rotatably disposed in said tape chamber at respective corner areas adjacent said front wall section and said pair of side wall sections, respectively;
   a length of magnetic recording tape anchored at a first end thereof to a first one of said reels, being trained about said pair of guide rollers, and having a second end anchored to a second one of said reels, such that said magnetic recording tape includes a front section extending between said pair of guide rollers and substantially in parallel to said front wall section, and such that said magnetic recording tape is adapted to travel between said first and second reels when said tape cassette is in use within a magnetic recording and/or reproducing apparatus;
   a presser pad disposed within said tape chamber rearwardly of and in alignment with said second access window and rearwardly of said front section of said magnetic recording tape, such that said front section of said magnetic recording tape is sandwiched between said presser pad and the magnetic recording and/or reproducing head when the magnetic recording and/or reproducing head is in a use position inserted into said tape chamber through said second access window; and
   first and second tape cleaners disposed within said tape chamber and secured to said first and second front wall portions so as to slidingly contact a forwardly facing surface of said front section of said magnetic recording tape, each of said first and second tape cleaners having a width sufficient to encompass the width of said magnetic recording tape.

2. The tape cassette as claimed in claim 1, wherein each of said first and second tape cleaners comprises a fiber-intertwined cleaning member made of a piece of non-woven fabric.

3. The tape cassette as claimed in claim 2, wherein only a longitudinally central portion of each of said first and second tape cleaners contacts said front section of said magnetic recording tape with respect to a lengthwise direction of said magnetic recording tape.

4. The tape cassette as claimed in claim 2, wherein portions of said front section of said magnetic recording tape held in sliding contact with said first and second tape cleaners, respectively, are rearwardly biased a predetermined bias distance within a range of 0.05 to 1 mm.

5. The tape cassette as claimed in claim 2, wherein said non-woven fabric is made of fibers of synthetic resin selected from the group consisting of rayon, nylon, polyester, polypropylene, and acryl.

6. The tape cassette as claimed in claim 5, wherein only a longitudinally central portion of each of said first and second tape cleaners contacts said front section of said magnetic recording tape with respect to a lengthwise direction of said magnetic recording tape.

7. The tape cassette as claimed in claim 5, wherein portions of said front section of said magnetic recording tape held in sliding contact with said first and second tape cleaners, respectively, are rearwardly biased a predetermined bias distance within a range of 0.05 to 1 mm.

8. The tape cassette as claimed in claim 1, wherein each of said first and second tape cleaners comprises a fiber-tufted cleaning member made of a tuft of fibers firmly and closely planted on a generally rectangular backing.

9. The tape cassette as claimed in claim 8, wherein said fibers are curled.

10. The tape cassette as claimed in claim 8, wherein said fibers are crimped.

11. The tape cassette as claimed in claim 8, wherein said fibers are made of synthetic resin selected from the group of consisting of nylon and polyester.

12. The tape cassette as claimed in claim 8, wherein portions of said front section of said magnetic recording tape held in sliding contact with said first and second tape cleaners, respectively, are rearwardly biased a predetermined bias distance within a range of 0.05 to 1 mm.

13. The tape cassette as claimed in claim 1, wherein said first and second front wall portions include rearwardly protruding generally semi-cylindrical protuberances, respectively; and said first and second tape cleaners are mounted on said semi-cylindrical protuberances so as to be disposed in arc shapes and such that only longitudinally central portions, with respect to a lengthwise direction of said front section of said magnetic recording tape, of each of said first and second tape cleaners contact said front section of said magnetic recording tape.

14. The tape cassette as claimed in claim 13, wherein said first and second tape cleaners constitute first and second means for biasing respective portions of said front section of said magnetic recording tape rearwardly a predetermined distance.

15. The tape cassette as claimed in claim 14, wherein said predetermined distance is in a range of 0.05 to 1 mm.

16. The tape cassette as claimed in claim 1, wherein rear surfaces of said first and second front wall sections are flat, respectively; and said first and second tape cleaners are respectively mounted to said rear surfaces of said first and second front wall sections, respectively.

17. The tape cassette as claimed in claim 16, wherein said first and second tape cleaners constitute first and second means for biasing respective portions of said front section of said magnetic recording tape rearwardly a predetermined distance.

18. The tape cassette as claimed in claim 17, wherein said predetermined distance is in a range of 0.05 to 1 mm.

* * * * *